US012059688B2

(12) United States Patent
Seidelson et al.

(10) Patent No.: US 12,059,688 B2
(45) Date of Patent: Aug. 13, 2024

(54) METHOD AND APPARATUS FOR CONTINUOUS MAGNETIC FILTRATION OF FERROUS MILL SCALE FROM LIQUID SOLUTIONS

(71) Applicant: GT of Ohio, LTD., Massillon, OH (US)

(72) Inventors: Craig Eric Seidelson, Fishers, IN (US); Mark H. Dickerhoof, Clinton, OH (US); John D. Eisenhut, Canton, OH (US)

(73) Assignee: GT of Ohio, Ltd., Massillon, OH (US)

( * ) Notice: Subject to any disclaimer, the term of this patent is extended or adjusted under 35 U.S.C. 154(b) by 680 days.

(21) Appl. No.: 17/268,235

(22) PCT Filed: Aug. 31, 2018

(86) PCT No.: PCT/US2018/049086
§ 371 (c)(1),
(2) Date: Feb. 12, 2021

(87) PCT Pub. No.: WO2020/046370
PCT Pub. Date: Mar. 5, 2020

(65) Prior Publication Data

US 2021/0237098 A1 Aug. 5, 2021

(51) Int. Cl.
*B03C 1/12* (2006.01)
*B03C 1/00* (2006.01)
(Continued)

(52) U.S. Cl.
CPC ................ *B03C 1/12* (2013.01); *B03C 1/002* (2013.01); *B03C 1/0332* (2013.01); *B03C 1/247* (2013.01);
(Continued)

(58) Field of Classification Search
None
See application file for complete search history.

(56) References Cited

U.S. PATENT DOCUMENTS 2,900,076 A * 8/1959 Israelson ................ B07C 5/344 209/229
3,146,191 A 8/1964 Greenwald
(Continued)

FOREIGN PATENT DOCUMENTS

CA 1196012 8/2007
CN 107838814 3/2018
(Continued)

OTHER PUBLICATIONS

Machine translation of CN-107838814-A, pp. 1-12). (Year: 2018).*
Machine translation of JP-2007203411-A, pp. 1-4. (Year: 2007).*

*Primary Examiner* — Clare M Perrin
(74) *Attorney, Agent, or Firm* — Renner, Kenner, Greive, Bobak, Taylor & Weber

(57) ABSTRACT

A method and apparatus for continuous magnetic filtration of ferrous mill scale from liquid solution employs a tank for receipt of fluids laden with mill scale. A curvate trough within the tank receives a rotatable magnetic drum and establishes a channel therebetween. An air compressor and associated manifold generate bubbles within the tank and adjacent the rotatable magnetic drum. The mill scale attaches to the bubbles, which are attracted to the surface of the drum where the mill scale accumulates. The accumulation of mill scale particles is moved about the surface of the rotating drum by a scraper proximate the surface thereof. By moving the accumulated mill scale particles to regions of the rotating drum that are of a magnetic force insufficient to retain them upon the surface of the drum, the mill scale particles are removed and passed to a conveyor system.

18 Claims, 4 Drawing Sheets

(51) Int. Cl.

| | |
|---|---|
| ***B03C 1/033*** | (2006.01) |
| ***B03C 1/247*** | (2006.01) |
| ***B03C 1/28*** | (2006.01) |

(52) U.S. Cl.

CPC .......... *B03C 1/284* (2013.01); *B03C 2201/18* (2013.01); *B03C 2201/20* (2013.01)

(56) References Cited

U.S. PATENT DOCUMENTS

| | | | | |
|---|---|---|---|---|
| 4,279,748 | A * | 7/1981 | Inoue | B01D 35/06 210/85 |
| 5,496,470 | A | 3/1996 | Lenhart | |
| 5,766,450 | A | 6/1998 | Herman et al. | |
| 7,255,793 | B2 | 8/2007 | Cort | |
| 8,777,015 | B2 | 7/2014 | Chappie et al. | |
| 2009/0184040 | A1 | 7/2009 | Tashiro | |
| 2014/0183104 | A1 | 7/2014 | Rothman et al. | |
| 2015/0336108 | A1 * | 11/2015 | Molteni | B03C 1/14 29/898.067 |

FOREIGN PATENT DOCUMENTS

| | | | | |
|---|---|---|---|---|
| CN | 107838814 | A * | 3/2018 | |
| EP | 2662184 | | 11/2013 | |
| EP | 3097980 | | 11/2016 | |
| GB | 2529874 | A * | 3/2016 | C22B 1/005 |
| JP | 200079353 | | 3/2000 | |
| JP | 2007203411 | | 8/2007 | |
| JP | 2007203411 | A * | 8/2007 | |
| KR | 20160031168 | | 3/2016 | |
| WO | 95/02459 | | 1/1995 | |
| WO | 1995002459 | | 1/1995 | |

* cited by examiner

METHOD AND APPARATUS FOR CONTINUOUS MAGNETIC FILTRATION OF FERROUS MILL SCALE FROM LIQUID SOLUTIONS

TECHNICAL FIELD

The invention herein resides in the art of steel processing systems and, more particularly, to a system and methodology for increasing the efficiency of extracting mill scale from industrial fluid during steel-working operations such as rolling, forging and the like. More particularly, the invention relates to a system and associated method by which mill scale is magnetically attracted to a rotating drum having an associated scraper for moving the scale upon the drum and ultimately removing it therefrom, thereby ridding the working fluid of such damaging particles. Specifically, the invention relates to a system and method that employs the introduction of bubbles into the industrial fluid, the bubbles securing and introducing the mill scale particles to the surface of the rotating drum to enhance the efficacy of the removal process.

BACKGROUND OF THE INVENTION

When steel is heated above 506° C. in the presence of air, a non-uniform surface layer of mill scale (hereafter referred to as scale) develops. This scale typically has a thickness of less than 1 mm. The scale is comprised of a thin outer layer of hematite ($Fe_2O_3$) followed by a layer of magnetite ($Fe_3O_4$). From the core outwardly, the scale is predominantly wüstite (FeO).

During the hot working of steel, fluids used to cool and lubricate tooling come into contact with scale. The ensuing rapid decrease in temperature causes scale to transform. Physically, it hardens to approximately 50 HRC (Rockwell Hardness). Chemically, the FeO becomes Fe and $Fe_3O_4$. Problematically, Fe and $Fe_3O_4$ do not adhere tightly to steel. The brittle and hardened scale chips off. Over the course of time, scale accumulates in machine pumps.

Scale presents a number of problems for the steel industry. As scale-laden machine coolant recirculates, the hardened particles damage equipment and pump seals. Scale also causes excessive tooling wear. To mitigate these problems, manufacturing operations must be periodically stopped to dredge scale from machine pumps, negatively impacting production. Replacement and repair of damaged equipment and pump seals has a similar negative effect on production.

It has been found that the key to increasing hot steel-working equipment uptime while reducing tooling and maintenance costs is removing scale as it is being generated. Unfortunately, due to the rapid rate at which scale forms, removal by in-line cyclonic filtration is not possible. Moreover, passing through filter media is not at all economical.

The industry has found that wet, magnetic drum filtration is ideal because (1) both the iron and magnetite particles are ferromagnetic, (2) no disposable media is required, and (3) continuous drum rotation rates can keep up with scale generation rates. For these reasons, iron ore is commonly filtered using magnetic drums. However, unlike iron ore, scale is not magnetically filtered in-line at machine tools.

The problems with filtering scale are many. To begin, unlike iron ore, scale has poor magnetic susceptibility. This is because of high drag forces on the scale particles caused by (1) emulsified oils in the coolant coating the scale, (2) the high flow rate of coolant, and (3) the existence of free machining oil and grease in the coolant, which tend to coat the scale. To overcome these drag forces, magnetic forces to collect scale need to be orders of magnitude greater than that for iron ore.

Since magnetic field gradients fall as to the third power with distance, producing the necessary lifting force requires an exceptionally small distance between scale-laden coolant and the magnetic drum. This small distance, however, results in increased coolant flow rates, which in turn increases drag forces. To compensate, magnetic filters must necessarily become very large. Indeed, their size then frustrates the desire for placement under the metal working equipment. Presently, it is desired that filters are placed under the machine tools to eliminate the need for pumps or hydrocyclones for moving the scale-laden cooling fluid, which tends to compromise pumps, seals, and the like over time.

Even if enough magnetic lifting strength or force could be achieved to attract scale, there is the additional issue of removal. The magnetic circuit inside the drum must also be designed sufficiently weak for the scraper to remove scale from the drum for disposal.

Additional challenges to scale removal and disposal are inherent with its high degree of hardness and small size. Scale is orders of magnitude harder than iron ore. Conventional drum, scraper, and conveyor materials used to filter and convey iron ore wear at a rate that quickly exceeds scale size. When this occurs, scale is no longer removed or disposed.

DISCLOSURE OF THE INVENTION

In light of the foregoing, it is a first aspect of the invention to provide a method and apparatus for continuous magnetic filtration of ferrous mill scale from liquid solutions that employs a drum having an enhanced magnetic field.

Another aspect of the invention is the provision of a method and apparatus for continuous magnetic filtration of ferrous mill scale from liquid solutions in which the magnetic field of the drum is characterized by regions of reduced magnetic force to accommodate scale removal by a scraper.

Further aspects of the invention are achieved by a method and apparatus for continuous magnetic filtration of ferrous mill scale from liquid solutions that incorporate a bubble generator adjacent a drum carrying a magnetic field, the bubbles generated thereby serving to entrain the mill scale from the liquid and introduce the scale to the drum, enhancing the effectiveness of the magnetic field to attract the mill scale to the drum by bringing the mill scale out of the liquid solution and into a contacting proximity with the drum.

Yet a further aspect of the invention is to provide a method and apparatus for continuous magnetic filtration of ferrous mill scale from liquid solutions in which the apparatus is small enough to be received beneath the steel-working equipment with which it is employed.

Still another aspect of the invention is the provision of a method and apparatus for continuous magnetic filtration of ferrous mill scale from liquid solutions that is readily implemented with state-of-the-art material, apparatus, and methodologies.

The foregoing and other aspects of the invention that will become apparent as the detailed description proceeds are achieved by a mill scale continuous magnetic filter for use with a steel-working system, comprising a tank adapted for communication with the steel-working system for receipt of fluids laden with mill scale; a curvate trough within said tank; a rotatable magnetic drum received within said curvate trough and establishing a channel between said curvate trough and rotatable drum; and means for generating bubbles within said tank and adjacent said rotatable magnetic drum.

Still further aspects of the invention are achieved by method for removing mill scale from fluids employed in a steel-working system, comprising passing a fluid laden with mill scale through a tank; introducing bubbles into the fluid such that the mill scale attaches to the bubbles; introducing the bubbles with attached mill scale to a rotating magnetic drum in such proximity to the drum that the mill scale particles are attracted to and accumulate upon the surface of the rotating magnetic drum; causing the accumulation of mill scale particles to be moved about the surface of the rotating drum by a scraper proximate the surface of the rotating magnetic drum; and causing some of the accumulation of mill scale particles to be removed from the surface of the rotating drum by moving the accumulation to regions of magnetic force at the surface of the drum that are insufficient to retain the mill scale particles on the surface.

BRIEF DESCRIPTION OF THE DRAWINGS

For a complete understanding of the apparatus and technique of the invention, reference should be made to the following detailed description and accompanying drawings wherein.

BEST MODE FOR CARRYING OUT THE INVENTION

The present invention overcomes the limitations and deficiencies of the prior art in a number of ways. Unlike conventional wet drum magnetic filters which rely on a dam between the drum and fluid on the inlet side, the discharge side of the tank of the present invention will hold fluid in front of the drum without a dam. The volume of coolant in front of the drum uniquely presents its scale particles to the magnetic drum through a system of bubbles. By tailoring the airflow rate (m/s) relevant to the coolant flow rate (m/s), bubbles of ideal size and dispersion may be created. The bubbler is fed using an air flow regulator. Air volume and flow rate through the bubbler are adjustably selected based on the flow rate and density of the cooling fluid to create bubbles of a desired size and dispersion. Bubble circumference is large enough to carry scale particles on the exterior surface of the bubble, while sufficiently dispersed so as not to interfere with one another. In this way, each bubble carries scale particles to the drum. The result is a bubbling up of scale particles and their buoyant presentation to the magnetic drum as entrained or carried by the bubbles.

Since the scale particles are introduced to the magnetic drum as carried by bubbles, the present invention does not rely solely upon channel clearance under the drum to present the scale particles to the drum as required in the prior art. With the present invention, this channel height can be orders of magnitude larger than in the prior art. In turn, this allows more coolant to pass under the drum, rendering the filter small enough to fit under most machine tools.

To ensure that the drum has sufficient magnetic strength to collect scale, and the scraper has sufficient ability to remove scale, rare-earth magnets and ferromagnetic spacers are laid out inside the drum in a unique configuration such that maximum electromagnetic field and gradient, with minimal losses, is created in most areas while being intentionally low (or effectively absent) in others.

To withstand abrasion from the hardened scale, the drum and scraper, unlike those used in conventional wet drum filters, are made of hardened, non-magnetic materials which do not rust. The scraper is made of hardened, non-magnetic magnesium steel. The drum may be formed from a hardened, stainless steel, non-magnetic sheet that is rolled into a cylinder, welded and centerless ground.

Finally, to dispose of scale removed from the drum, material handling conveyors are fitted with scrapers. To ensure conveyor beds across which scrapers pass do not wear, such scrapers are made of a hardened, ultra-high molecular weight polymer, such as that made under the mark "Tivar." The polymer is sufficiently hard and self-lubricating to last a minimum of one year under continual use. Thereafter, new polymer scrapers are readily installed.

Figure 1:
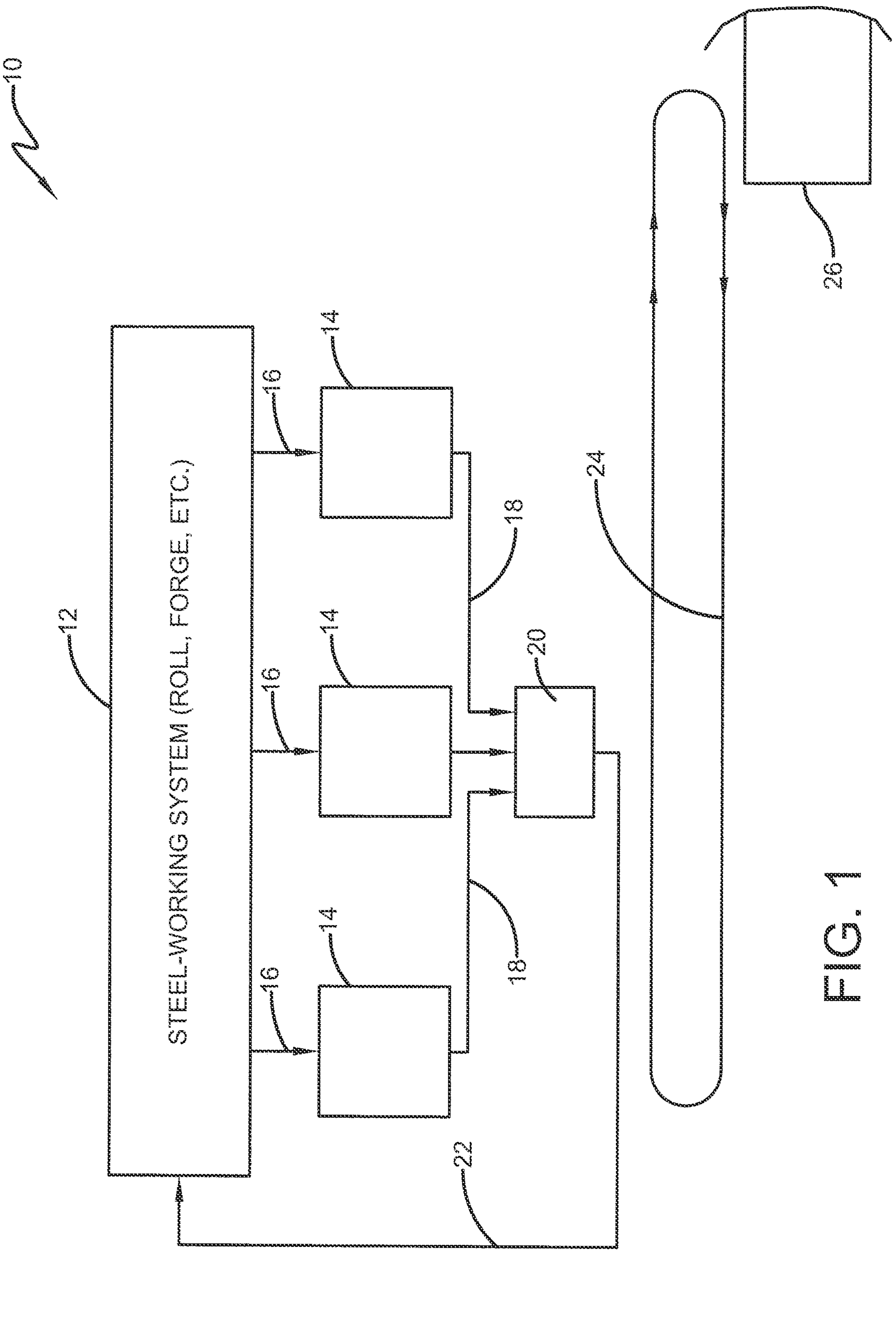
FIG. 1 is a schematic block diagram of a steel-working system employing the method and apparatus for continuous magnetic filtration of ferrous mill scale from liquid solution according to the invention.

Referring now to the drawings and more particularly FIG. 1, it can be seen that a steel processing system adapted for implementation with the invention is designated generally by the numeral 10. The system 10 includes a steel-working system 12, which may be of any of various types, including a system for rolling, forging, or otherwise treating steel. As will be readily appreciated by those skilled in the art, the system 12 employs coolant and working oil, as discussed above. Associated with the steel-working system 12 is one or more mill scale magnetic filtration systems made in accordance with the invention and designated generally by the numeral 14. The systems 14 will be discussed in detail below. Suffice it to say, that conduits 16 interconnect the steel-working system 12 with the filtration systems 14 for purposes of passing working oil/coolant laden with fine particles of mill scale from the working system 12 to the magnetic filtration systems 14, which extract the mill scale particles from the working oil/coolant fluids and pass the filtered fluids through conduits 18 to a recovery tank with associated sump pumps 20. The sump pumps serve to pass the filtered fluids through the conduit 22 back to the steel-working system 12. The extracted mill scale particles are dropped onto an appropriate conveyor 24, which transports the extracted mill scale to an associated disposal bin 26.

As will become apparent herein, any number of mill scale magnetic filtration systems 14 may be used in association with a particular steel-working system 12 to satisfy the requirements of the necessary volume and speed of filtration necessitated by the system 12. The concept of the invention contemplates at least one such filtration system 14 associated with the recovery tank and sump 20, conduit 22, conveyor 24, and disposal bin 26.

It will also be noted from FIG. 1 that the structures of the invention are such that the magnetic filtration system 14 may be placed beneath the steel-working system 12 for improved efficiency of material handling. In this way, the scale-laden coolant will not require pumping, thus avoiding the damage to pumping systems experienced in the prior art.

Figure 2:
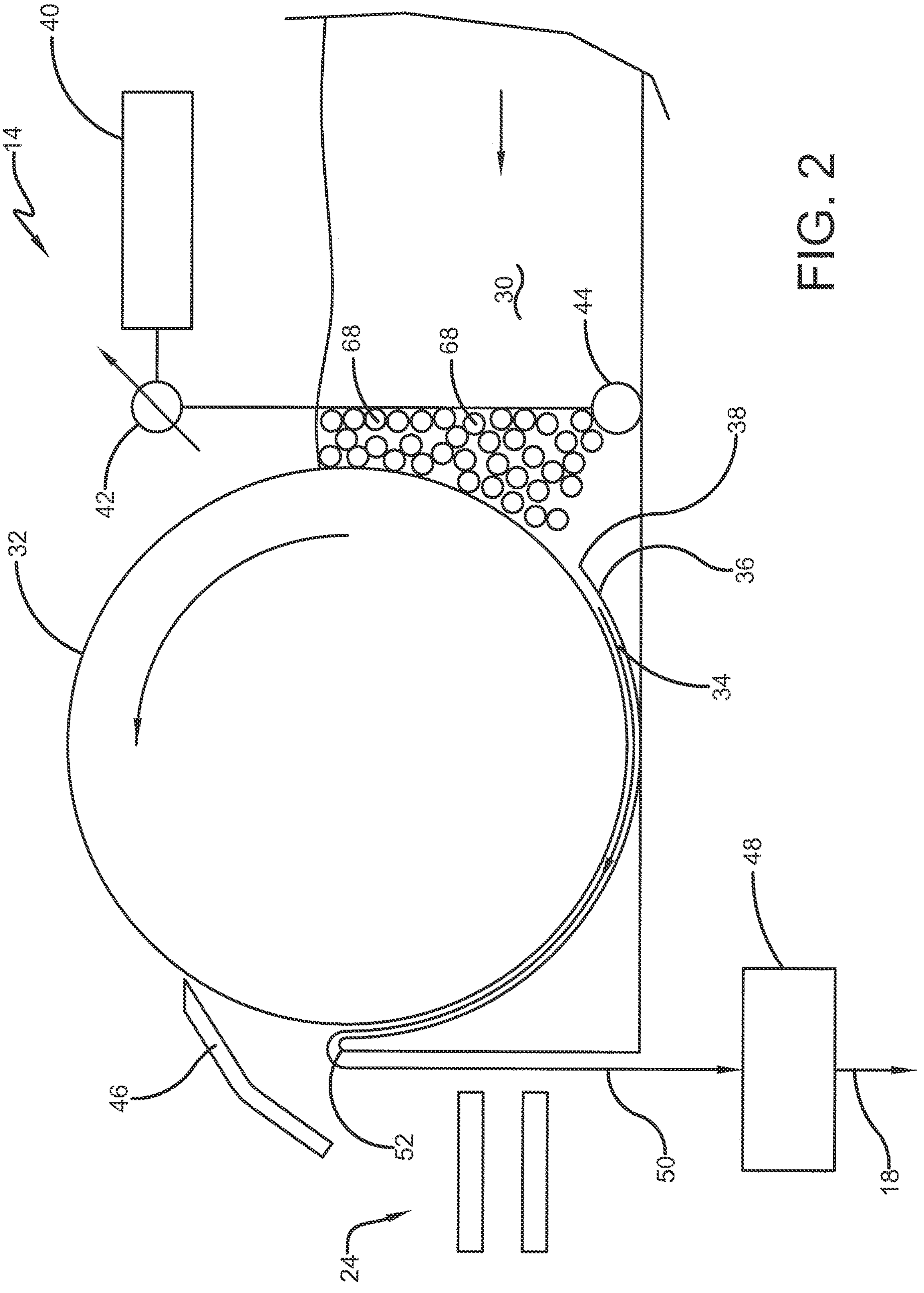
FIG. 2 is an illustration of the system of the invention.

With reference now to FIG. 2, it can be seen that the mill scale magnetic filtration system 14 of the invention consists of a tank 30 receiving a slurry of coolant/machine oil laden with scale. The slurry is passed from the steel-working system 12 to the tank 30 by conduit 16, as shown in FIG. 1. A rotating drum 32 is nested within a curvate trough or channel 34 defined by a curved wall 36 extending only slightly above the floor of the tank 30. Unlike the prior art, which established a dam between the tank 30 and the drum 32, the top edge 38 of the wall 36 establishes no dam at all, but simply provides an entrance to the curvate trough 34 between the rotating drum 32 and wall 36.

While the prior art desires a non-turbulent laminar flow of slurry past the rotating drum 32, the instant invention provides an air compressor 40 in communication with an associated flow regulator and valve system 42 to pass compressed air to an air manifold 44 placed in juxtaposition to and slightly beneath the top edge 38 of the wall 36. The air manifold 44 may consist of a pipe having a length substantially the same as the axial length of the rotating drum 32, the pipe having a plurality of radial holes or apertures therein for air escapement to form bubbles in the slurry adjacent the drum 32. The amount of air flow necessary for generating adequate bubbles within the slurry is achieved by adjusting through the flow regulator 42 the amount of air passed from the air compressor 40 to the manifold 44.

It has been found that the bubbles generated by the air manifold 44 will themselves become laden with mill scale particles on their surface and, as the bubbles reach the drum 32, they will impinge upon the drum, bringing the scale particles into extremely close, if not contacting, engagement with the outer surface of the rotating drum 32.

As will become apparent below, the drum 32 has an associated magnetic field that will attract and hold the scale particles. The generation of bubbles ensures that the mill scale be brought into either contacting or extremely close proximity to the surface of the rotating drum 32 such that the associated magnetic field will have the greatest likelihood possible to attract and maintain the mill scale against the surface of the drum 32. By entraining the mill scale upon the surface of the bubbles 38, a sufficiently close proximity of the scale to the surface of the drum 32 is ensured.

The bubbles provide the mill scale particles with a buoyancy that urges the paramagnetic particles sufficiently close to the magnetic field of the drum 32 for the field to effect the necessary attraction and retention. As the bubbles burst against the drum 32, the scale that they have carried is received by the drum 32 and the liquid of the bubble is passed to the trough or channel 34. The rotating drum 32 thus carries a layer of mill scale held in place by a strong magnetic field. A scraper 46 is positioned immediately adjacent the surface of the drum 32 and extending along the entire length thereof, with the scraper 46 engaging the mill scale coating of the drum 32 and maneuvering it to positions where the magnetic field is absent or sufficiently weak, that the scale is actually removed from the drum surface. The scale so removed passes down the body of the scraper 46 and is deposited by gravity onto the conveyor 24 for transfer to the disposal bin 26. Similarly, unlike the prior art that employed a drum rotating at a fixed speed, the rotating drum 32 is driven by an electric drive so that the rotational speed can be adjusted to overcome drag forces and ensure transfer of the mill scale onto the scraper 46 a sufficient distance to avoid reattachment to the drum while still having a magnetic field of sufficient strength.

The fluid of the burst bubbles 38 passes through the trough or channel 34 to the back edge 52 of the back wall 36 and passes thereover such that the filtered oil/coolant 50 passes into and is received by the recovery tank 48. As is apparent from FIGS. 1 and 2, the filtered oil/coolant 50 passes by means of the conduit 18 to the recovery and sump tank 20. If only a single mill scale magnetic filtration system 14 is employed, the recovery tank 48 may be eliminated such that the filtered oil/coolant 50 passes directly through the conduit 18 to the recovery tank and sump 20.

Figure 3:
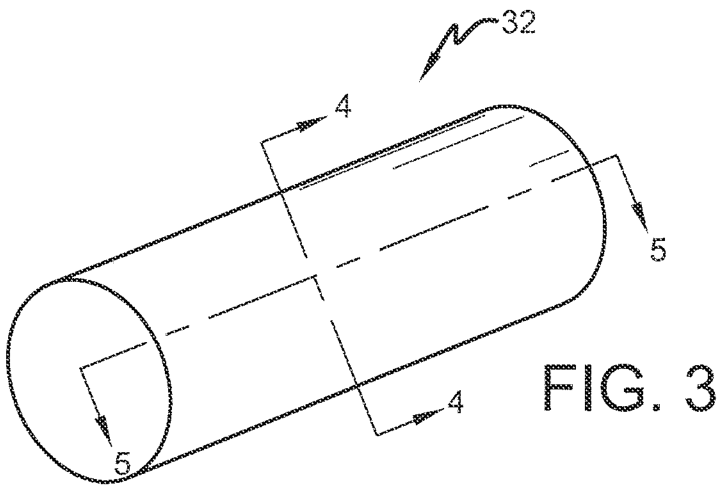
FIG. 3 is a perspective view of the drum employed by the invention.

The rotating drum 32 is shown alone in FIG. 3. It preferably comprises a stainless steel construction. The drum 32 is preferably precision formed for consistent radial dimensions, as is the back wall 36 of the tank 30 to ensure, to the extent possible, uniformity of the depth of the trough/channel 34 and the uniformity of the spacing/clearance of the scraper 46 to the surface of the drum 32.

Figure 4:
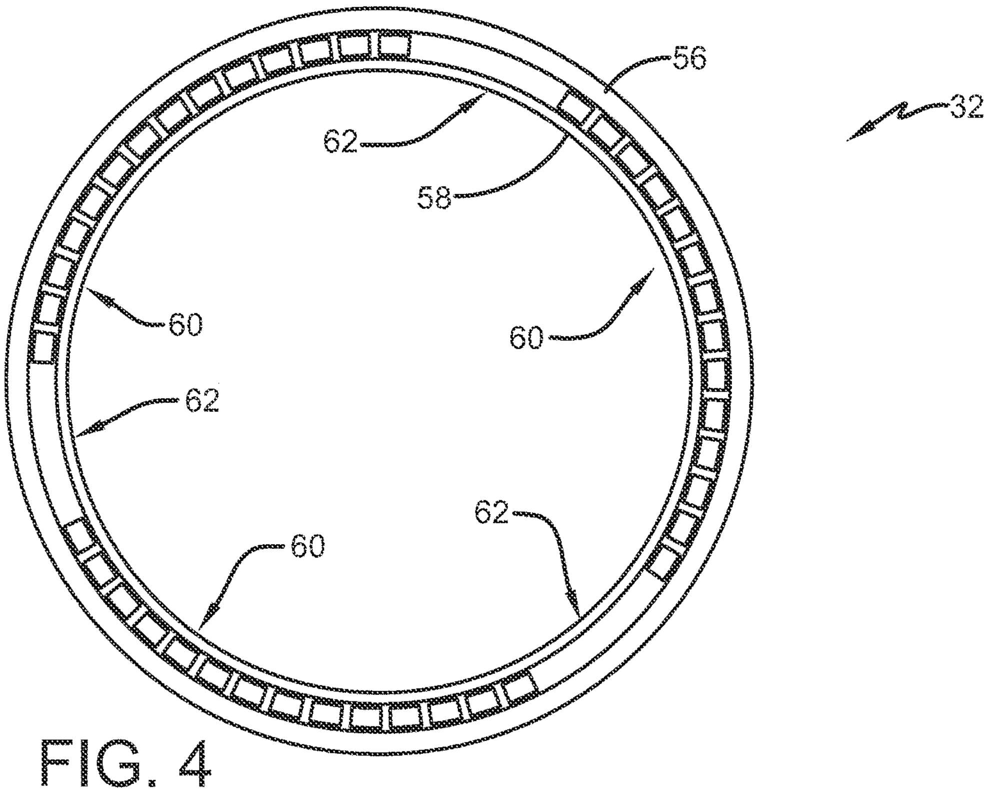
FIG. 4 is a cross-sectional view of the drum of FIG. 3, taken along the line 4-4, showing the placement of permanent magnets therewithin.

As shown in FIG. 4, the drum 32 consists of an outer drum shell 56 and an inner drum shell 58, or other inner support member to connect the outer drum shell 56 to an appropriate means for effecting rotation. As presented above, the outer drum shell 56 is preferably of non-magnetic stainless steel construction. The inner drum shell 58 is preferably of magnetic steel construction. Sandwiched between the inner surface of the outer shell 56 and the outer surface of the inner shell 58 are arrays 60 of magnetic elements, it being preferred that the same be rare-earth permanent magnets. Three such uniform arrays 60 are shown with spacings 62 interposed between the various arrays.

Figure 5:
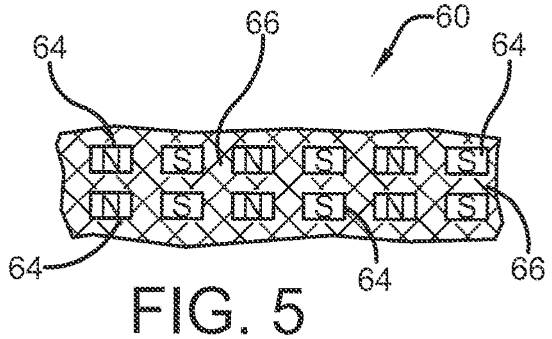
FIG. 5 is a partial illustration of the placement of the permanent magnets within the drum as shown in FIG. 4, with spacers therebetween.

As shown in FIG. 5, the rare-earth permanent magnets 64 may be oriented as to their north and south poles as shown, although it will be appreciated that various other arrangements may be employed for purposes of achieving the desired field strength and ease of assembly. Interposed between the rare-earth magnets 64 are ferromagnetic spacers 66, operating as fillers between the magnets 64 of the array or matrix 60. The spacers 66 provide a separation between magnets 64 on the order of 0.25-0.50 inch, and most preferably on the order of 0.33 inch, which has been found to allow magnets 64 of the same polarity to sit adjacent while those of opposite polarity exhibit minimal field loss.

Those skilled in the art will appreciate that the stainless steel outer drum shell 56 is non-magnetic. The three arrays 60 of magnetic elements 64 create a magnetic field within the drum, the field passing through the drum to attract the scale. In one embodiment, the outer drum shell 56 is of a hardened, non-magnetic grade of stainless steel and the rare-earth magnets are of the N52 type, exhibiting a very strong magnetic attraction. With three arrays 60 established with separations 62 maintained therebetween, the magnetic field exhibited by the rotating drum 32 is uniform around the drum with the three spacings 62 defining areas of extremely low magnetic field attraction. In other words, in the embodiments shown there are three areas of significantly low or null magnetic field.

As scale builds up on the outer surface of the rotating drum 32, the scale is held against the surface of the drum by the extremely strong magnetic field generated by the rare-earth permanent magnets 64. The scraper 46 is maintained in extremely close proximity, on the order of 0.10-0.50 mm, and most preferably 0.20 mm, to the outer surface of the drum 32. Such is sufficient to accommodate any out-of-roundness of the drum 32, while small enough to remove scale. The scraper 46 effectively moves the scale as the drum 32 rotates, such that each time the scale reaches one of the areas 62 of substantially null magnetic field, the scale is separated from the drum surface to the conveyor 24. Since the magnetic field is substantially uniform about the drum 32, but for the null area 62, the scale is easily moved circumferentially about the outer surface of the drum 32 and, upon reaching the null area 62, the scale buildup is easily separated or removed by the scraper 46. In effect, the scraper 46 peels the scale from the outer surface of the drum 32.

According to one concept of the invention, the permanent magnets 64 are preferably arcuate in shape and have an outer radius corresponding to the inner radius of the outer drum shell 56 such that the magnets conform to the shell, ensuring not only optimum generation of magnetic field strength, but also uniformity. Similarly, the permanent magnets 64 preferably have an inner radius corresponding to the outer radius of the inner shell 58 for the desired conformity. Further, it has been found that the spacings 62 between the arrays 60 of magnetic elements 64 should be on the order of 1.5-2.5 inches, and most preferably 2 inches when employing N52 permanent magnets. In such embodiment, the inner drum shell 58 has an outside diameter on the order of 8.5 inches and the outer drum shell 56 has an outer diameter of 10.5 inches.

It will be appreciated that mill scale is extremely small and hard. Because the flakes are small and in a slurry, they are subjected to drag imposed by the liquid in which they are found, requiring a large force to attract and draw them out of the slurry. In the prior art, once attracted to the rotating drum, the scale was extremely difficult to remove. Moreover, the prior art relied upon keeping the gap of the curvate trough or channel 34 as small as possible such that the magnetic field would be strong enough to attract the scale. This resulted in systems that were either so large that they could not fit beneath the steel-working system itself, or in a necessary reduction of processing speeds. All of this resulted in an increase in cost and a reduction in throughput of production. Using the generation of bubbles by means of the air compressor 40, flow regulator 42, and air manifold 44, the channel size and spacing or gap can be increased and the size of the entire unit decreased such that it can fit under the associated steel-working system 12.

Of particular significance is the fact that the industry standard for magnetic filtration of iron ore is 980 gauss. Because of drag forces associated with removing wet mill scale, the required field is much higher-on the order of 30,000 gauss. The issue with generating such a massive field is removing the scale once attracted. For this reason, certain areas of the field around the drum are intentionally designed very low. These areas allow for accumulated scale to be removed from the drum.

While the prior art desired a quiescent flow of fluid to the trough or channel 34, the instant invention purposefully seeks agitation of the fluid at the entrance to the curvate trough or channel 34 such that the scale is entrained or carried by bubbles 68 for direct impingement upon the rotating drum 32. By employing the air flow regulator 42, the bubbles 68 generated by the air manifold 44 can be correlated with the flow rate of the fluid slurry within the tank 30 to optimize effective operation of the filter system 14. In the prior art, the generation of bubbles would be avoided in order to reduce the drag of the slurry. The present invention, however, seeks to generate bubbles 68 and to use those bubbles for introducing the scale to the rotating drum. All of this increases the efficiency of the filter system, allowing for its reduction in size and accommodating its presentation below the steel-working system 12.

Figure 6:
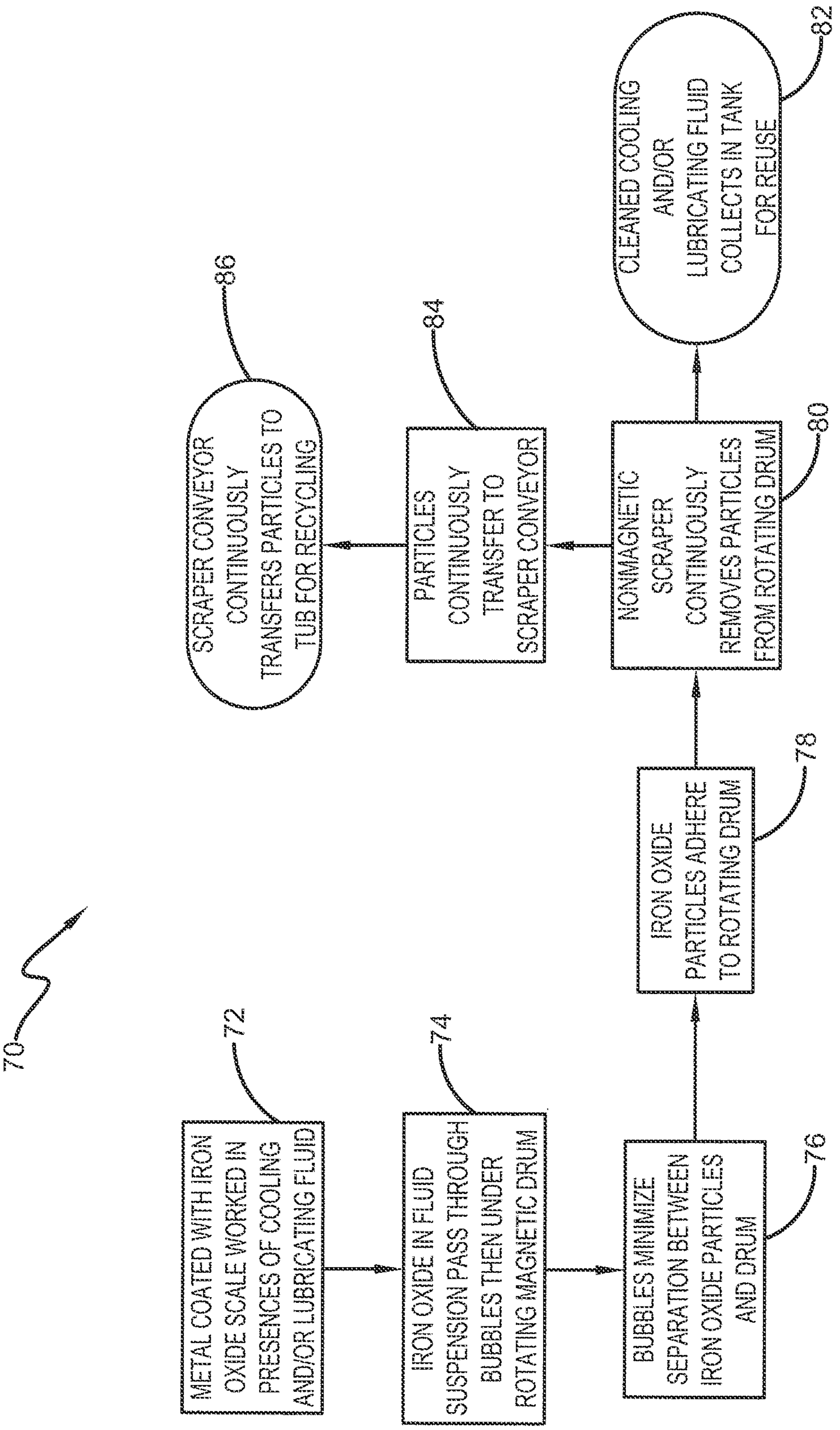
FIG. 6 is a flowchart of the method practiced by the invention.

With reference now to FIG. 6, it can be seen that the process of the invention is generally shown and designated by the numeral 70. In the steel-working system 12 of FIG. 1, metal coated with iron oxide scale is worked in the presence of cooling and/or lubricating fluid as shown at 72. At 74, the iron oxide particles in the fluid suspension pass through bubbles generated by the bubble generator 40, 42, 44 and to the rotating magnetic drum 32. The bubbles typically engage the outer surface of the drum 32 and, at the least, minimize the separation between the iron oxide particles and the drum as at 76. At 78, the strong magnetic field generated by the arrays 60 of magnetic elements 64 cause the iron oxide particles to adhere to the rotating drum 32. A non-magnetic, hardened magnesium steel scraper 46 is closely positioned to the outer surface of rotating drum 30 along its entire length and continuously removes scale particles from the drum, as at 80. The filtered cooling and/or lubricating fluid that exits the trough or channel 34 is then ultimately collected by a recovery tank and sump 20 for reuse and/or reintroduction to the steel-working system 12, as at 82. At the same time, as shown at 84, the scale particles that are removed from the exterior of the rotating drum 32 are continuously transferred as by gravity or the like to the conveyor 24. As designated at 86, the scraper conveyor 24 continuously transfers the scale particles to a tub or disposal bin 26 for recycling or other use.

In light of the foregoing, it should be appreciated that the present invention significantly advances the art by providing a method and apparatus for continuous magnetic filtration of ferrous mill scale from liquid solutions that is structurally and functionally improved in a number of ways. The benefits of the in-line filtration system of the invention include (1) the production system need not be stopped to dredge the tank or repair pumps, (2) factories need not install massive sumps to accumulate scale for periodic disposal, (3) substantial increases in tooling life, and (4) the ability to collect scale as it is generated for recycling.

Moreover, the invention uniquely provides a magnetic filtration system specifically designed to remove mill scale. The bubbler takes into account mill scale size and weight to create a bubble of sufficient size, surface tension and frequency to present mill scale to the magnet. Due to the weak magnetic susceptibility of mill scale, a magnetic circuit, a magnetic field 30 times that used to collect iron ore, has been presented.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A mill scale continuous magnetic filter for use with a steel-working system, comprising:

- a tank adapted for communication with the steel-working system for receipt of fluids laden with mill scale;
- curved wall within said tank;
- a rotatable magnetic drum adjacent said curved wall and establishing a channel between said curved wall and rotatable drum; and
- means for generating bubbles comprising an air compressor and an air manifold, said air manifold being adjacent said rotatable magnetic drum and in juxtaposition to and slightly beneath a top edge of said curved wall, such that said bubbles carry said mill scale and introduce said mill scale to said rotatable magnetic drum.

2. The mill scale continuous magnetic filter as recited in claim 1, further comprising a scraper having an edge in proximity to an outer surface of said rotatable magnetic drum sufficient to engage and move mill scale about said outer surface.

3. The mill scale continuous magnetic filter as recited in claim 2, wherein said edge of said scraper is proximate said outer surface of said rotatable magnetic drum on the order of 0.10-0.50 millimeter.

4. The mill scale continuous magnetic filter as recited in claim 2, further comprising a conveyor positioned to receive mill scale from said scraper.

5. The mill scale continuous magnetic filter as recited in claim 4, further comprising a recovery tank in communication with said channel for receiving the fluids from which mill scale has been extracted.

6. The mill scale continuous magnetic filter as recited in claim 2, wherein said rotatable magnetic drum comprises a plurality of arrays of magnetic elements operatively attached to and maintained within an outer drum shell.

7. The mill scale continuous magnetic filter as recited in claim 6, wherein said magnetic elements are permanent magnets.

8. The mill scale continuous magnetic filter as recited in claim 7, wherein said arrays each comprise a plurality of permanent magnets separated by ferromagnetic spacers.

9. The mill scale continuous magnetic filter as recited in claim 8, wherein said ferromagnetic spacers have a width on the order of 0.25-0.50 inch.

10. The mill scale continuous magnetic filter as recited in claim 6, wherein said plurality of arrays of permanent magnets are separated from each other by 1.5-2.5 inches.

11. The mill scale continuous magnetic filter as recited in claim 10, wherein said rotatable magnetic drum further comprises an inner drum shell, said magnetic elements being maintained between said outer and inner drum shells.

12. The mill scale continuous magnetic filter as recited in claim 11, wherein said outer drum shell is non-magnetic and said inner drum shell is magnetic.

13. The mill scale continuous magnetic filter as recited in claim 12, wherein said scraper is made of hardened magnesium steel.

14. A method for removing mill scale from fluids by employing the continuous magnetic filter as recited in claim 5 in a steel-working system, comprising:

passing a fluid laden with mill scale through the tank;

using the air compressor and air manifold to introduce bubbles into the fluid such that the mill scale attaches to the bubbles and the bubbles carry the mill scale and introduce the mill scale to the rotatable magnetic drum in such proximity to said rotating magnetic drum that the mill scale is attracted to and accumulates upon the surface of the rotating magnetic drum;

using the scraper to move the accumulation of mill scale about the surface of the rotating drum by; and cause some of the accumulation of mill scale particles to be removed from the surface of the rotating drum by moving the accumulation to regions of magnetic force at the surface of the drum that are insufficient to retain the mill scale particles on the surface.

15. The method for removing mill scale from fluids as recited in claim 14, wherein the mill scale particles removed from the surface of the drum are received by a conveyor and transported for recycling.

16. The method for removing mill scale from fluids as recited in claim 15, wherein the fluid from which the bubbles have extracted mill scale is collected in a tank for reuse.

17. The method for removing mill scale from fluids as recited in claim 16, wherein the bubbles are introduced into the fluid near the bottom of the tank and proximate the rotating magnetic drum.

18. The method of claim 14, wherein the rotating magnetic drum includes regions of higher magnetic attraction and regions of lower or null magnetic attraction, and, wherein the mill scale is attracted to and accumulates upon the surface of the rotating magnetic drum at the regions of higher magnetic attraction, and the mill scale is removed from the surface of the rotating magnetic drum by moving the accumulation to the regions of lower or null magnetic attraction, the regions of lower or null magnetic attraction providing magnetic forces at the surface of the rotating magnetic drum that are insufficient to retain the mill scale on the surface.

* * * * *